Figure 4:
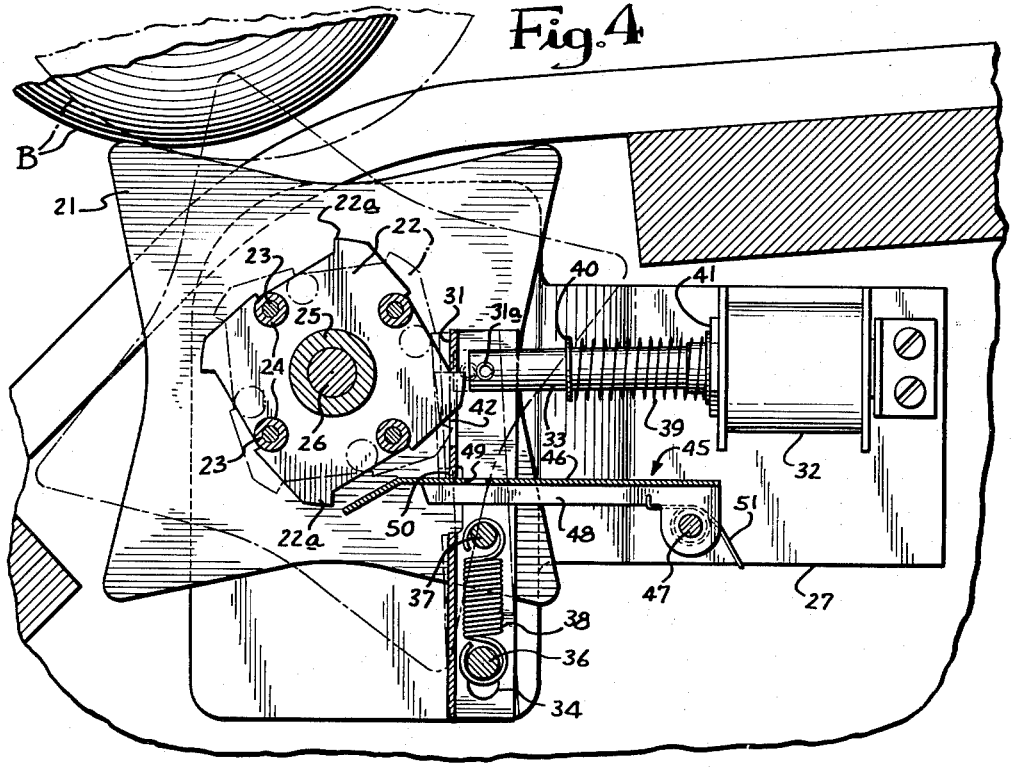

July 18, 1961 M. P. WOLVERTON 2,992,825
ARTICLE FLOW CONTROL
Filed Jan. 21, 1958 2 Sheets-Sheet 1
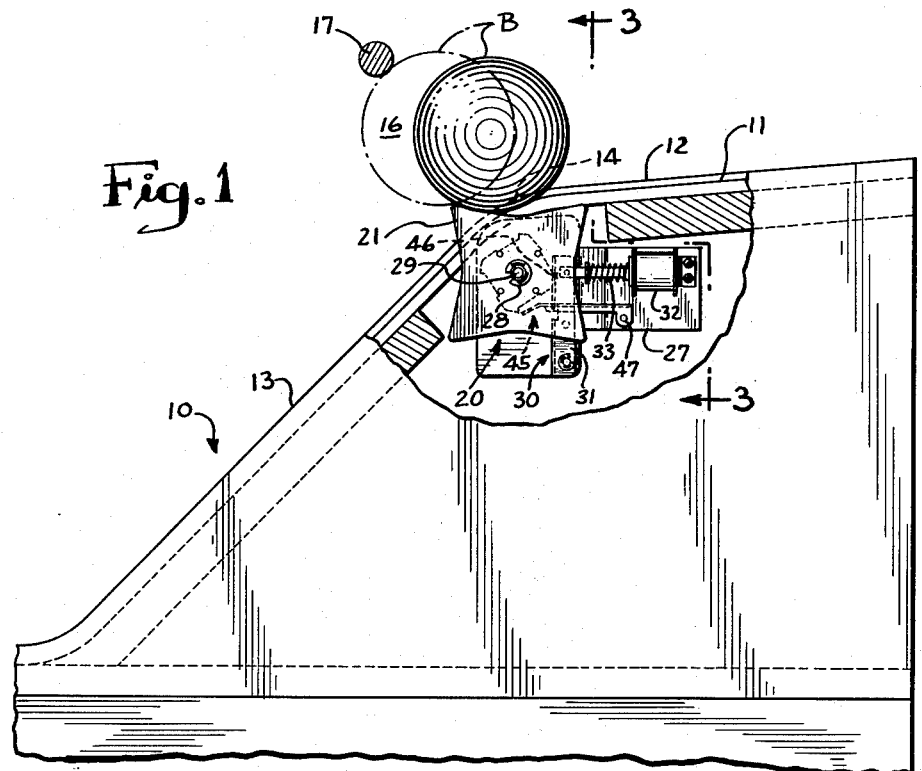
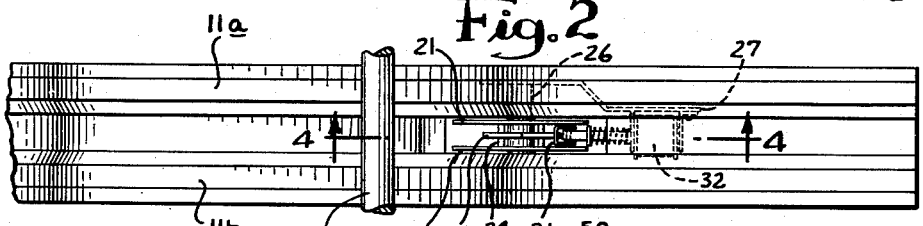
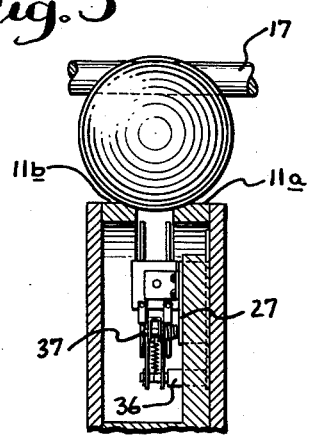
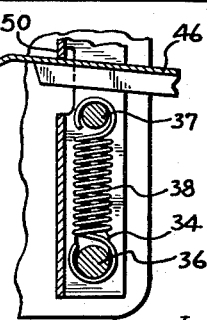
INVENTOR
MARCINE P. WOLVERTON
by: *Marc. F. Cayn*
ATTY.

July 18, 1961     M. P. WOLVERTON     2,992,825
ARTICLE FLOW CONTROL
Filed Jan. 21, 1958     2 Sheets-Sheet 2

INVENTOR
MARCINE P. WOLVERTON
ATTY.

2,992,825
ARTICLE FLOW CONTROL
Marcine P. Wolverton, Chicago, Ill., assignor to United Manufacturing Company, Chicago, Ill., a corporation of Illinois
Filed Jan. 21, 1958, Ser. No. 710,318
9 Claims. (Cl. 273—49)

This invention relates to article flow control means, more particularly a gate release device controlling the passage of an article such as a ball, or the like, whereby a given number of such articles may be permitted to pass along a flow path as desired.

A variety of situations exists in which it is desired to control the passage of an article along a flow path. Thus, in the vending or dispensing arts, articles are dispensed to a consumer in a controlled manner responsive to compliance with the requirements of the dispensing mechanism, either by the insertion of coins, the actuation of control levers, or the like. Generally, these mechanisms are so constructed that a flow path in the form of a runway is provided, down which the articles may move. Some form of stop or gating device is interposed in the path of the article down the runway, and the control for the device is arranged to release the stop means as desired, so as to permit the further passage of the articles along their flow path. A variety of problems is, however, engendered in that the article, in its free flow up to the control point or station, impinges on the stop means with a force which eventually has a deleterious effect upon the mechanism. Additionally, release of the stop means does not necessarily insure the passage of an article therepast, with the result that the consumer may often comply with the requirements of the dispensing mechanism without receiving the dispensed article. As in all dispensing mechanisms, it is of course desirable to insure that the mechanism can only be operated to permit the passage of an article upon compliance with the aforementioned requirements.

It is with the above problems in mind that the present means have been evolved, means providing article flow control, whereby an article may be stopped in its normal flow path with its shock effect on the mechanism minimized, and release of the control mechanism to permit the flow of an article may be effected with the release maintained effective until an article has passed along its flow path. Additionally, the novel means here provided prevent operation of the release device in any but the approved methods for operation of the dispensing mechanism.

It is accordingly a primary object of this invention to provide improved article flow control means.

An additional object of this invention is to provide article flow control means for use in a controlled mechanism, whereby articles will be permitted to move along a flow path only when such mechanism is actuated in an approved manner.

It is also an object of this invention to provide novel article flow control means in which an article is stopped in its free movement through a mechanism, with a dissipation of the shock forces resulting from the stoppage of the article.

Another object of the invention is to provide article flow control means in which once the means are actuated to a condition permitting the flow of an article, said means remain in this condition until an article is passed.

A still further object of this invention is to provide a novel ball gate release device for controlling the passage of a ball along a runway.

An additional object of this invention is to provide novel article flow control means having a minimum number of parts, requiring minimal maintenance, and simply fabricated and operated.

It is additionally an object of this invention to provide a novel method for the control of the passage of an article along a flow path.

These, and other objects of the invention, which will become apparent in the following specification and claims, are achieved by provision of article flow control means along a runway, forming a flow path for the articles. The novel means comprise a movable engaging member arranged in conjunction with the runway to temporarily engage the article to be controlled. Retaining means maintain said engaging means in article engaging position. Releasing means are provided for releasing said retaining means to permit the article engaging means to free the article for movement along said runway. Delaying means function to prevent said retaining means from assuming an operative position, that is, one forcing the engaging means into article stopping position until an article has been permitted to pass along said runway. Additionally, shock absorbing means are provided for dissipating the shock energy produced by stoppage of the article by said engaging means.

A primary feature of this invention is the provision of a novel gate release device permitting release of a stopped article which has been engaged in its passage down a runway. The stoppage of the article is cushioned at the moment of engagement so as to dissipate the shock load produced by the impact of the article on the engaging means. This is accomplished by providing a spring mount in combination with the gate release device.

An additional important feature of the invention is the provision of delaying means which function to maintain the gate release device in a position which will not interfere with the passage of an article down a runway until an article has actually passed down the runway.

Another object is to provide a novel flow control means actuated by a solenoid or equivalent device and which functions to release only one article for each pulse to the solenoid, irrespective of the number of articles which may be retained on the runway and waiting to be released.

Another important feature of the invention resides in the provision of a novel camming surface on the novel gate release device which will prevent manual tampering with the gate release so as to permit unauthorized flow of an article therepast.

Figure 5:
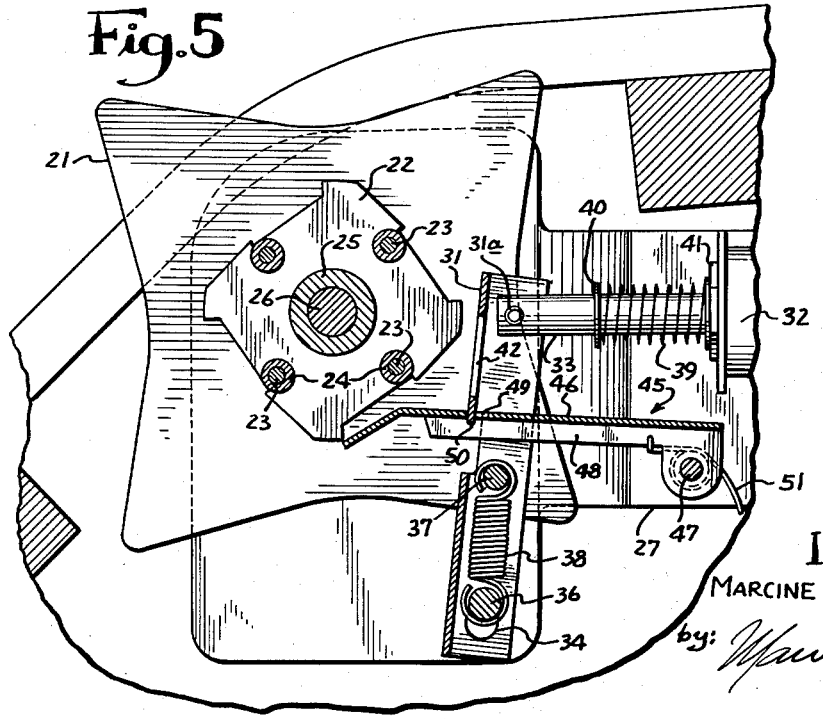

The specific structural details of a preferred embodiment of the invention, and their mode of functioning, will be made most manifest and particularly pointed out in conjunction with the accompanying drawings, wherein:

FIGURE 1 is a schematic elevational view with parts broken away of a runway, down which a ball may roll, showing the novel article flow control means arranged to control the passage of a ball down the runway; and FIGURE 2 is a top plan view looking down on the structure illustrated in FIGURE 1; and FIGURE 3 is a cross-sectional view taken on line 3—3 of FIGURE 1; and FIGURE 4 is an enlarged detail view taken on line 4—4 of FIGURE 2, of the flow control device showing the parts in their movement from an article engaging position to an article releasing position; and FIGURE 5 is an enlarged detail view similar to FIGURE 4, showing the control device in a position permitting the flow of articles, with the delaying means in operative position; and FIGURE 6 is a detail view of the shock absorbing means provided to dissipate the shock load produced when the article is stopped in its movement down the runway.

Referring now more particularly to the drawings, like numerals in the various figures will be taken to designate like parts.

As best seen in FIGURE 1, an article dispensing device 10 is shown having a runway 11 providing a flow path for an article. In the drawings, the invention is shown embodied in a structure, as illustrated, for return of a bowling ball B in a coin operated, simulated bowling game.

Runway 11 is formed of two spaced track sections 11a and 11b, having inner bevelled edges, as best seen in FIGURES 2 and 3. Runway 11 is arranged with a shallowly inclined portion 12 and a steeply inclined portion 13. The steeply inclined portion 13 leads to a part of the game device (not illustrated), where the player will have access to the ball B. At the turning point 14, between the shallowly inclined portion 12 and the steeply inclined portion 13 of runway 11, an article engaging station 16 is formed. Article engaging station 16 is formed by means of a stationary stop 17 arranged at a distance above the runway, such that an article passing along the shallow portion 12 will be restrained by stop 17 until the article moves to the steeply inclined portion 13.

Arranged beneath the runway 11 at station 16 is the novel article flow control device, as best seen in the cutaway portion of FIGURE 1, and in FIGURES 4 and 5. The article flow control device comprises an article engaging member 20, here shown as including a pair of spaced parallel star plates 21, each plate having four points 90° out of phase. Mounted between the star plates 21 is a ratchet cam plate 22 secured to said plates by means of rivets 23, or the like, and arranged to rotate with said plates. Spacers 24 are provided between star plates 21 and ratchet plate 22 to maintain the ratchet plate 22 centrally with respect to said pair of star plates.

The assembled star plates 21 and ratchet cam plate 22 are secured to collar 25. The collar 25 is then journalled for rotation on stud shaft 26. Stud shaft 26 is secured to a mounting bracket 27. The star plates-cam plate assembly is secured for rotation on the stud shaft 26 by means of spring clip 28, engaging in a notch on the free end of stud shaft 26, as best seen in FIGURE 1, and the assembly is maintained in its spaced position with respect to mounting bracket 27 by means of a shoulder formed on the stud shaft, as best seen in FIGURE 2.

Releasing means 30 comprising a retaining latch 31, vertically extending as viewed in the drawings; a solenoid 32; and an armature 33 extending from said solenoid into pivotal engagement with said retaining latch at 31a are mounted on mounting bracket 27. The retaining latch 31 is formed of a U-shaped channel member having slotted apertures 34 formed in the arms of latch 31, and arranged near the lower part thereof, as viewed in FIGURES 1, 4 and 5. Stud shaft 36 is fixed to plate 27 and is arranged with a reduced bearing portion of said stud shaft extending through said slotted apertures. Pin 37 is secured between the arms of retaining latch 31, and tension spring 38 is extended between stud shaft 36 and pin 37 for a purpose to become hereinafter more apparent. Compression spring 39 is arranged on armature 33 between a collar 40 secured to said armature 33, and a bearing surface 41 on solenoid 32. As is apparent, armature 33 is slidable within solenoid 32 and is forced to the left, as viewed in FIGURES 1, 4 and 5, by means of spring 39. Cam aperture 42 formed in latch 31 receives a toothed portion 22a of cam plate 22, as seen in FIGURES 1 and 4. The right-hand (inner) end of armature 33 fits within the interior of the coil of solenoid 32 with sufficient clearance and free play to permit slight pivotal movement of armature 33 in a clockwise direction. This permits latch 31 to be raised slightly as tension spring 38 extends due to the initial impact of the rolling ball or other object with star plates 21, as explained below.

Delaying means 45 comprises a delaying latch 46 horizontally extending as viewed in the drawing, pivoted on a reduced portion of stud shaft 47 extending from mounting plate 27. Latch 46 extends through an aperture 48 in the retaining latch. A detent is formed by slot 49 in delaying latch 46, which engages dog 50 formed at the periphery of aperture 48, as viewed in FIGURE 5. Spring 51 is arranged about stud 47 with one spring leg secured to mounting plate 27, and the other leg of the spring acting on delaying latch 46 to force same in a clockwise direction, as viewed in FIGURES 1, 4 and 5.

*Operation*

The novel flow control means, as noted, have been illustrated and described in conjunction with a coin operated, simulated bowling game.

Where so employed, the control means are positioned beneath runway 11, down which a bowling ball B may move. After the bowling ball is thrown down the alley (not shown), and knocks down the pins, the ball is raised and travels down the shallowly inclined portion 12 of runway 11 under the action of gravity, until it reaches article engaging station 16, at which point it is stopped between stationary stop 17 and one of the points of star plate 21, which extends out from between the track sections 11a and 11b. The shock energy produced as a result of stopping the ball in its free movement down the trackway is dissipated by spring 38, as best seen in FIGURES 4–6. The impact of ball B on the upwardly extending points of star plates 21 tends to rotate the plates 21, causing the toothed portion of cam plate 22 which is in engagement in cam aperture 42 to raise retaining latch 31 against the action of spring 38, so that there is relative sliding between latch 31 and stud shaft 36, extending spring 38 and thus dissipating the shock energy.

The stopped ball B may thereafter be released for dispensing to a player by completing a circuit to energize solenoid 32. The circuit and the particular coin control mechanism are not shown. The solenoid will be actuated momentarily, causing armature 33 to move to the right, as viewed in FIGURE 4, to the position shown in FIGURE 5. In this position, dog 50 is engaged in slot 49 of delaying latch 45, which is upwardly biased by spring 51. In this position, star plate 21 is free to rotate in a counter-clockwise direction from the dotted line position to the solid line position, as viewed in FIGURE 4. The weight of the ball B forces the upwardly extended point of star plate 21 to rotate until the ball B is released to slide down the steeply inclined portion 13 of runway 11. Once a ball has been relased, the rotation of star plate 21 is such as to cause cam plate 22 to engage the free end of delaying latch 46, as viewed in FIGURE 5, to depress delaying latch 46, disengaging same from the retaining latch 31, which under the action of spring 39, is returned to the position illustrated in FIGURE 1, preventing further rotation of the star wheel beyond ninety degrees until the solenoid has again been actuated.

However, in the event that the solenoid has been actuated, and star plate member 20 has not been rotated before cessation of energization of the solenoid, latch 46 will remain engaged with retaining latch 31, thus maintaining the engaging member 20 in a released condition until the ball finally arrives to cause member 20 to rotate through its cycle of ninety degrees.

If the novel flow control means are so positioned in conjunction with the game structure that a player might possibly fraudulently manipulate or jiggle the star wheel or the ball, the shape of the cam plate 22 is such as to prevent clockwise movement of the star wheel, whereby it will not be possible to force retaining latch 46 away from the cam plate without energizing the solenoid.

It is thus seen that novel article flow control means have been provided, gating the passage of an article down a flow path and permitting such passage only upon actuation of a mechanism in a proper fashion. The novel flow control means is relatively foolproof, is such that once properly actuated, the flow path remains unrestricted until an article has passed, and any shock loads produced by the stopping of an article are substantially dissipated.

The above disclosure has been given by way of illustration and elucidation, and not by way of limitation, and it is desired to protect all embodiments of the herein disclosed inventive concept, within the scope of the appended claims.

What is claimed is:

1. In a simulated bowling game, ball return means comprising: a runway formed by two spaced tracks having bevelled inner edges forming a trough for the ball, said runway having a shallowly inclined portion and a steeply inclined portion, said portions leading respectively to and from an article engaging station; a pair of spaced star plates rotatably mounted beneath said runway, each star plate having a plurality of points, a point on each plate extending upwardly into the runway at any instant; a ratchet cam plate supported for rotation with and between said star plates; a retaining latch pivotally and slideably mounted to extend between said star plates, said retaining latch having a cam aperture for engagement by said cam plate; an armature pivotally secured to said retaining latch to move same into and out of engagement with said cam plate; a solenoid surrounding a portion of said armature to control its motion; a spring biasing said armature to a position urging said retaining latch to engage said cam plate; a delaying latch pivotally mounted adjacent said retaining latch and said cam plate, said delaying latch having a detent engaging said retaining latch when said retaining latch is retracted by said armature out of contact with said cam plate, and having a portion contacted by said cam plate to move the delaying latch to release the retaining latch when the star plate and cam plate have been rotated due to the passage of a ball down the runway; a spring biasing said delaying latch to a cam plate engaging position; and a shock absorbing spring arranged at the slideable pivot mount of said retaining latch to dissipate the shock load produced by stopping the ball in its movement down the runway.

2. An article flow control device comprising: a runway formed by two spaced tracks having bevelled inner edges forming a trough for a ball, said runway having a shallowly inclined portion and a steeply inclined portion, said portions leading respectively to and from an article engaging station; a pair of spaced star plates rotatably mounted beneath said runway, each star plate having a plurality of points, a point on each plate extending upwardly into the runway at any instant; a ratchet cam plate supported for rotation with and between said star plates; a retaining latch pivotally and slideably mounted to extend between said star plates, said retaining latch having a cam aperture for engagement by said cam plate; an armature pivotally secured to said retaining latch to move same into and out of engagement with said cam plate; a solenoid surrounding a portion of said armature to control its motion; a spring biasing said armature to a position urging said retaining latch to engage said cam plate; a delaying latch pivotally mounted adjacent said retaining latch and said cam plate, said delaying latch having a detent engaging said retaining latch when said retaining latch is retracted by said armature out of contact with said cam plate, and having a portion contacted by said cam plate to move the delaying latch to release the retaining latch when the star plate and cam plate have been rotated due to the passage of a ball down the runway; a spring biasing said delaying latch to a cam plate engaging position; and a shock absorbing spring arranged at the slideable pivot mount of said retaining latch to dissipate the shock load produced by stopping the ball in its movement down the runway.

3. A device for controlling the flow of articles, said device comprising a runway providing a path for an article to be moved, article engaging means located adjacent said runway and having a plurality of extensions, one of said extensions being disposed in said path to engage said moving article, means mounting said article engaging means for movement in response to said engagement of said one extension by said article from a position in which the one extension is disposed in said path to a position in which the one extension is removed from said path to allow the article to continue along the path and in which another of said extensions is disposed in said path, a retaining member located adjacent said engaging means, holding means on said retaining member, means mounting said retaining member for movement between a first position in which said holding means engages said engaging means and holds the latter against movement thereby preventing movement of said article along said path and a second position in which said holding means is released from said engaging means, means normally urging said retaining means towards its first position, and means actuable to move said retaining means from its first to its second position.

4. A device as recited in claim 3 and comprising means mounting said retaining member for movement while in its first position in response to the impact arising when said moving article engages said extension, and shock absorbing means connected to said retaining member for absorbing said impact.

5. A device as recited in claim 3 and comprising delaying means for holding said retaining means in its second position following said movement thereof, and means for releasing said delaying means in response to said movement of said engaging means.

6. A device as recited in claim 3 and comprising a stationary stop member located adjacent said runway opposite said engaging means and in a position to obstruct said article and prevent the latter from being moved around the periphery of said extension when the engaging means is held against movement.

7. A device for controlling the flow of articles, said device comprising a runway providing a path for an article to be moved, a star plate located adjacent said runway and having a plurality of points, one of said points extending in said path to engage said moving article, means mounting said star plate for rotary movement from a position in which said one point is disposed in said path to a position in which said one point is removed from the path to allow said article to continue along the path and in which another of said points extends in said path, a cam plate mounted for rotary movement in conjunction with said star plate, a retaining latch located adjacent said cam plate, holding means on said retaining latch, means mounting said retaining latch for movement between a first position in which said holding means engages said cam plate and holds the latter against movement thereby preventing movement of said article along said path and a second position in which said holding means is disengaged from said cam plate, spring means normally biasing said retaining latch towards its first position, and solenoid means connected to said retaining means and actuable to move the retaining means to its second position.

8. A device as recited in claim 7 and comprising means mounting said retaining latch for movement while in its first position in response to the impact arising when said moving article engages said point, and shock absorbing means connected to said retaining latch for absorbing said impact.

9. A device as recited in claim 7, and comprising a delaying latch located adjacent both said retaining latch and said cam plate, means mounting said delaying latch for movement between a first position in which the delaying latch engages the cam plate and a second position in which the delaying latch is disengaged therefrom, spring means normally urging said delaying latch towards said first position thereof, means on said cam plate for moving said delaying latch from said first position to said second position thereof in reponse to said movement of said cam plate, second holding means on said retaining latch engaging said delaying latch when the retaining latch is in its first position and the delaying latch is in its second position to hold said delaying latch in said second position, and third holding means on said delaying latch engaging said retaining latch when the delaying latch is in its first position and the retaining latch is in its second position to hold the retaining latch in its second position.

References Cited in the file of this patent

UNITED STATES PATENTS

| | | |
|---|---|---|
| 832,250 | Frish | Oct. 2, 1906 |
| 1,253,471 | Ellison | Jan. 15, 1918 |
| 1,979,466 | Hedenskoog | Nov. 6, 1934 |
| 2,115,647 | Ross | Apr. 26, 1938 |
| 2,292,753 | Gerald | Aug. 11, 1942 |
| 2,491,349 | Wilson | Dec. 13, 1949 |
| 2,505,932 | Anderson | May 2, 1950 |
| 2,505,963 | Hedenskoog | May 2, 1950 |
| 2,528,341 | Greely | Oct. 31, 1950 |
| 2,579,925 | Jackson | Dec. 25, 1951 |
| 2,713,488 | Magrath | July 19, 1955 |